(12) United States Patent
Briggs et al.

(10) Patent No.: US 10,362,555 B2
(45) Date of Patent: Jul. 23, 2019

(54) CELLULAR TELECOMMUNICATIONS NETWORK

(71) Applicant: British Telecommunications Public Limited Company, London (GB)

(72) Inventors: Keith Briggs, London (GB); Sian Webster, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/079,327

(22) PCT Filed: Feb. 21, 2017

(86) PCT No.: PCT/EP2017/053957
§ 371 (c)(1),
(2) Date: Aug. 23, 2018

(87) PCT Pub. No.: WO2017/148752
PCT Pub. Date: Sep. 8, 2017

(65) Prior Publication Data
US 2019/0069265 A1    Feb. 28, 2019

(30) Foreign Application Priority Data

Mar. 4, 2016    (EP) .................................... 16158665

(51) Int. Cl.
*H04W 64/00* (2009.01)
*H04W 40/08* (2009.01)
(Continued)

(52) U.S. Cl.
CPC ........... *H04W 64/003* (2013.01); *G01S 11/06* (2013.01); *H04B 17/318* (2015.01);
(Continued)

(58) Field of Classification Search
CPC . H04W 24/10; H04W 72/0473; H04W 40/38; H04W 52/242; H04W 40/08; H04W 64/003
See application file for complete search history.

(56) References Cited

U.S. PATENT DOCUMENTS 8,903,402 B2    12/2014    Guo et al.
9,215,629 B2    12/2015    Hapsari et al.
(Continued)

FOREIGN PATENT DOCUMENTS

CN    105611554 A    5/2016
EP    2 154 917 A1    2/2010
(Continued)

OTHER PUBLICATIONS

Application and Filing Receipt for U.S. Appl. No. 15/516,765, filed Apr. 4, 2017, Inventor(s): Fitch et al.
(Continued)

*Primary Examiner* — Ashley Shivers (57) ABSTRACT

This disclosure provides a method of calculating a distance between a first and second base station in a cellular communications network, and a base station for performing said method, the method including a first base station periodically measuring a power of received signals from a second base station; the first base station identifying a first and second most frequent power of received signals in the periodic measurements; and the first base station determining a distance to a second base station based on the identified first and second most frequent power.

12 Claims, 5 Drawing Sheets

(51) Int. Cl.
*H04W 72/04* (2009.01)
*H04W 24/10* (2009.01)
*H04B 17/318* (2015.01)
*G01S 11/06* (2006.01)
*H04W 24/08* (2009.01)
*H04W 84/04* (2009.01)

(52) U.S. Cl.
CPC .......... *H04W 24/08* (2013.01); *H04W 24/10* (2013.01); *H04W 40/08* (2013.01); *H04W 64/00* (2013.01); *H04W 72/0473* (2013.01); *H04W 84/045* (2013.01)

(56) References Cited

U.S. PATENT DOCUMENTS

| | | | |
|---|---|---|---|
| 9,301,105 | B2 | 3/2016 | Kim et al. |
| 9,392,420 | B2 | 6/2016 | Fodar et al. |
| 9,439,137 | B2 | 9/2016 | Kim et al. |
| 2010/0120447 | A1 | 5/2010 | Anderson et al. |
| 2010/0157911 | A1 | 6/2010 | Hedge et al. |
| 2010/0178912 | A1 | 7/2010 | Gunnarsson et al. |
| 2011/0143806 | A1* | 6/2011 | Song ............... H04W 16/08 455/522 |
| 2011/0190027 | A1 | 8/2011 | Michel et al. |
| 2011/0274030 | A1 | 11/2011 | Wang et al. |
| 2012/0002537 | A1 | 1/2012 | Bao et al. |
| 2012/0026865 | A1 | 2/2012 | Fan et al. |
| 2012/0157095 | A1 | 6/2012 | Fodor et al. |
| 2012/0188884 | A1* | 7/2012 | Simonsson ....... H04W 36/0083 370/252 |
| 2012/0236828 | A1 | 9/2012 | Hapsari et al. |
| 2012/0257495 | A1 | 10/2012 | Schwarz et al. |
| 2012/0264418 | A1 | 10/2012 | Lee et al. |
| 2012/0275315 | A1 | 11/2012 | Schlangen et al. |
| 2013/0005340 | A1 | 1/2013 | Drazynski et al. |
| 2013/0035033 | A1 | 2/2013 | Sanneck et al. |
| 2013/0084873 | A1 | 4/2013 | Sharony et al. |
| 2013/0176874 | A1* | 7/2013 | Xu ............... H04W 52/242 370/252 |
| 2013/0260768 | A1 | 10/2013 | Guo et al. |
| 2014/0038593 | A1 | 2/2014 | Kim et al. |
| 2014/0071891 | A1 | 3/2014 | Zhou et al. |
| 2014/0092765 | A1 | 4/2014 | Agarwal et al. |
| 2014/0187236 | A1 | 7/2014 | Chiang et al. |
| 2014/0269547 | A1 | 9/2014 | Valliappan et al. |
| 2015/0004975 | A1* | 1/2015 | Yamamoto ........... H04W 36/30 455/436 |
| 2015/0063136 | A1 | 3/2015 | Shen et al. |
| 2015/0092552 | A1 | 4/2015 | Bajj et al. |
| 2015/0131524 | A1 | 5/2015 | Cavalcante et al. |
| 2015/0271714 | A1 | 9/2015 | Shetigar et al. |
| 2015/0358940 | A1 | 12/2015 | Zhang et al. |
| 2016/0192177 | A1 | 6/2016 | Kim et al. |
| 2017/0086181 | A1 | 3/2017 | Briggs |
| 2018/0262922 | A1 | 9/2018 | MacKenzie et al. |

FOREIGN PATENT DOCUMENTS

| | | |
|---|---|---|
| EP | 2271142 A1 | 1/2011 |
| EP | 2 814 279 A1 | 12/2014 |
| WO | WO 2010/024743 A1 | 3/2010 |
| WO | WO 2011/028158 A1 | 3/2011 |
| WO | WO 2011/056023 A2 | 5/2011 |
| WO | WO 2012/138125 A2 | 10/2012 |
| WO | WO 2013/071813 A1 | 5/2013 |
| WO | WO 2013/120274 A1 | 8/2013 |
| WO | WO 2013/142361 A1 | 9/2013 |
| WO | WO 2009/022976 A1 | 2/2016 |
| WO | WO 2016/079016 A1 | 5/2016 |
| WO | WO 2016/146328 A1 | 9/2016 |
| WO | WO 2017/148752 A1 | 9/2017 |
| WO | WO 2017/157585 A1 | 9/2017 |

OTHER PUBLICATIONS

Application and Filing Receipt for U.S. Appl. No. 15/553,708, filed Aug. 25, 2018, Inventor(s): Fitch et al.
Application and Filing Receipt for U.S. Appl. No. 16/082,870, filed Sep. 6, 2018, Inventor(s): MacKenzie et al.
Application and Filing Receipt for U.S. Appl. No. 15/762,022, filed Mar. 21, 2018, Inventor(s): MacKenzie et al.
Application and Filing Receipt for U.S. Appl. No. 16/023,917, filed Jun. 29, 2018, Inventor(s): MacKenzie et al.
GB Search and Examination Report for GB Application No. GB1710989.3; dated Dec. 1, 2017; 5 pages.
Extended European Search Report for EP Application No. 14194204.5 dated Jul. 23, 2015; 7 pages.
International Search Report & Written Opinion for PCT Application No. PCT/US2015/076524 dated Dec. 21, 2015; 11 pages.
International Preliminary Report on Patentability from the International Preliminary Examining Authority for PCT Application No. PCT/US2015/076524 dated Mar. 7, 2017; 11 pages.
Motorola et al., "Draft CR capturing HeNB inbound mobility agreements" 3GPP Draft; R2-096401 CR HENB 36_300 Agreements_ V7, 3rd Generation Partnership Project (3GPP), Jeju, Korea (Nov. 9, 2009); 4 pages. XP050391033.
Qualcomm Europe, "QoS support for hybrid CSG cells," 3GPP Draft; R3-091454, 3rd Generation Partnership Project (3GPP), San Francisco, US (May 4, 2009); 3 pages. XP050341776.
Qualcomm Europe et al., "QoS principles for CSG members and nonmembers at hybrid access mode HeNBs," 3GPP Draft; R3-091022, $3^{rd}$ Generation Partnership Project (3GPP), San Francisco, US (Apr. 19, 2009); 4 pages. XP050341407.
International Search Report and Written Opinion for PCT Application No. PCT/EP2016/053286 dated Apr. 11, 2016; 11 pages.
International Preliminary Report on Patentability for PCT Application No. PCT/EP2016/053286 report completed Feb. 6, 2017; 13 pages.
Extended European Search Report for EP Application No. 15275077.4 dated Sep. 4, 2015; 8 pages.
Codan Radio, "RF Link Controlled Base Station", Codan Radio Communications https://www.codanradio.com/product/fr-link-controlled-base/ Accessed Aug. 8, 2017; 2 pages.
$3^{rd}$ Generation Partnership Project, "3GPP 36.420 v8.0.0 Technical Specification; X2 general aspects and principals (Release 8)", (Dec. 2007) http://www/qtc.jp/3gpp/Specs/36420-800.pdf; 11 pages.
International Preliminary Report on Patentability for PCT Application No. PCT/EP2017/052738 dated Jun. 22, 2018; 27 pages.
International Search Report and Written Opinion for PCT Application No. PCT/EP2017/052738 dated Mar. 27, 2017; 20 pages.
Written Opinion for PCT Application No. PCT/EP2017/052738 dated Feb. 15, 2018; 12 pages.
European Search Report for EP Application No. 16160809.6 dated Sep. 26, 2016; 14 pages.
UK Examination Report for GB Patent Application No. GB1604515. 5, dated May 11, 2017, 1 pages.
UK Examination Report for GB Patent Application No. GB1604515. 5, dated Jan. 31, 2018, 3 pages.
UK Intention to Grant for GB Patent Application No. GB1604515.5, dated May 11, 2018, 2 pages.
UK Combined Search and Examination Report for corresponding GB Patent Application No. GB1604515.5, dated Sep. 9, 2016, 3 pages.
Younis, et al.; Military Communications; "Cognitive MANET Design for Mission-Critical Networks", IEEE Communications Magazine, Oct. 2009; 0163-6804/09 2009 IEEE; 5 pages.
$3^{rd}$ Generation Partnership Project; Technical Specification Group Services and System Aspects; Telecommunication Management; "Study on Management of Evolved Universal Terrestrial Radio Access Network (E-UTRAN) and Evolved Packet Core (EPC)"; Release 8 3GPP TR 32.816 V8.0.0 (Dec. 2008) Technical Report; Valbonne—France; 38 pages.
Qualcomm Technologies, Inc,; "LTE Small Cell SON Test Cases Functionality and Interworking"; Jun. 5, 2015; Qualcomm Technologies, Inc. 5775 Morehouse Drive San Diego, CA 92121 U.S.A.; 82 pages.

(56) References Cited

OTHER PUBLICATIONS

EP Search Report for EP Application No. 15187067.2; dated Mar. 18, 2016; 8 pages.
GB Examination Report for GB Application No. 1517069.9; dated Jan. 31, 2018; 3 pages.
GB Search Report for GB Application No. 1517069.9; dated Mar. 7, 2016; 4 pages.
International Preliminary Report on Patentability for PCT Application No. PCT/EP2016/069745, dated Oct. 20, 2017, 14 pages.
International Search Report and Written Opinion of the International Searching Authority for PCT Application No. PCT/EP2016/069745, dated Nov. 11, 2016, 11 pages.
Wu et al., Hai Jiang Yi; "Physical Cell Identity Self-Organization for Home eNodeB Deployment in LTE"; Nokia Siemens Networks; 978-1-4244-3709-2/10; 2010 IEEE; Beijing China; 6 pages.
NGNM the engine of broadband wireless innovation "Recommended Practices for multi-vendor SON deployment" Deliverable D2 Version 1.0 by NGNM Alliance; Reading Bridge House George Street Reading Berkshire RG1 8LS UK; Jan. 28, 2014; 30 pages.
Small Cell Forum Release 9.0; Document I76.09.01 LTE small cell SON test cases: Functionality and interworking; version 176.09.01; Feb. 21, 2017; 95 pages.
Fairbrother et al., "A Two-Level Graph Partitioning Problem Arising in Mobile Wireless Communications"; arXiv:1705.08773v1 [math.OC] May 24, 2017; 23 pages.
Web article, "DSDP", NEOS Interfaces to DSDP http://www.mcs.anl.gov/DSDP; retrieved Jul. 3, 2017; 4 pages.
Web article, "Welcome to CVXPY" Welcome to CVXPY—CVXPY 0.4.9 documentation, retrieved Jul. 3, 2017; http://www.cvxpy.org/en/latest; 1 page.
Ghaddar et al., "A branch-and-cut algorithm based on semidefinite programming for the minimum k-partition problem"; Ann Oper Res DOI 10 1007/s10479-008-0481-4; Springer Science+Business Media, LLC 2008; Published online Dec. 3, 2008; 20 pages.
Rendl, F., "Semidefinite Relaxations for Partitioning, Assignment and Ordering Problems"; Cross Mark, Ann Oper Res (2016) 240 119-140 DOI 10 1007/s10479-015-2015-1; Published online Sep. 15, 2015; Springer Science+Business Media New York 2015; 22 pages.
Carlson et al., "Scheduling to Minimize Interaction Cost"; The Johns Hopkins University, Baltimore, Maryland; Jun. 2, 1965; 8 pages.
Ning et al., "Fuzzy layered physical cell identities assignment in heterogeneous and small cell networks"; Electronics Letters May 12, 2016, vol. 52 No. 10, pp. 879-881; 2 pages.
European Search Report for EP Application No. 17180358.8; dated Jan. 31, 2018; 5 pages.
International Search Report and Written Opinion for corresponding International Application No. PCT/EP2017/053957 dated Jul. 23, 2017; 11 pages.
European Search Report for corresponding EP Application No. 16158665.6 dated Sep. 13, 2016; 6 pages.
GB Combined Search and Examination Report for GB Application No. GB1603748.3; dated Aug. 26, 2016; 6 pages.
Mukhopadhyay et al.; "Novel RSSI Evaluation Models for Accurate Indoor Localization with Sensor Networks"; 978-1-4799-2361-8/14; 2014 IEEE; Bharti School of Telecommunication Technology and Management IIT Delhi Hauz Khas, New Delhi; 6 pages.
3rd Generation Partnership Project; Technical Specification Group Radio Access Network; Evolved Universal Terrestrial Radio Access (E-UTRA); Radio Frequency (RF) system scenarios (Release 9) 3GPP TR 36.942 V9.3.0 (Jun. 2012); 83 pages.
Macqueen, J. "Some Methods for Classification and Analysis of Multivariate Observations"; Fifth Berkeley Symposium; University of California, Los Angeles (1967). pp. 281-297 (17 pages total).

\* cited by examiner

CELLULAR TELECOMMUNICATIONS NETWORK

CROSS-REFERENCE TO RELATED APPLICATION

The present application is a National Phase entry of PCT Application No. PCT/EP2017/053957, filed Feb. 21, 2017, which claims priority from EP Patent Application No. 16158665.6, filed Mar. 4, 2016, each of which is hereby fully incorporated herein by reference.

TECHNICAL FIELD

The present disclosure relates to a cellular telecommunications network.

BACKGROUND

Cellular telecommunications networks include a base station configured to transmit wireless signals over a coverage area to several User Equipments (UEs). Traditional cellular networks included base stations transmitting over a large coverage area, typically several kilometers squared, and serving many thousands of UEs. However, the trend in cellular networks has been to increase the density of base stations per unit area, each with a smaller coverage area and serving fewer UEs. These high density cellular networks have a relatively high capacity and offer users greater data rates. The small-scale base stations are often known as small cells, and include picocells, microcells, metrocells and femtocells (depending on their coverage area).

In $4^{th}$ Generation cellular networks, such as Long-Term Evolution (LTE), these small cells are also known as Home evolved NodeBs (HeNBs). Unlike traditional cellular networks in which the base stations are installed and configured by technical experts of Mobile Network Operators (MNOs), these HeNBs will likely be installed by end-users and will rely on distributed Self-Organizing Network (SON) algorithms for self-configuration. The task of these distributed SON algorithms is to automatically configure each base station in the network with configuration parameters that optimize that base station's coverage and capacity, whilst trying to minimize any interference caused on other base stations in the network. The inputs to these SON algorithms are typically locally measured properties (such as the results of a radio environment scan) rather than those distributed between base stations by control signaling.

A useful input parameter to these SON algorithms is the distance between the HeNB and its closest neighboring base station. If two HeNBs include geolocation technology (such as a Global Navigation Satellite System, GNSS, module), then it is able to calculate this distance by comparing their respective locations. However, this is not an optimal solution as the GNSS module generally does not work indoors, increases the unit cost of the HeNB, and relies on the distribution of this data and therefore an increase in control signaling. Furthermore, this distance may become inaccurate if one base station is moved, and thus requires periodic recalculation (which, for GNSS geolocation, requires substantial processing). For HeNBs without geolocation technology, it is difficult for a HeNB to determine its distance to its nearest neighbor from local measurements alone, as it is difficult to distinguish one neighbor transmitting at low power from a more distant neighbor transmitting at high power.

SUMMARY

It is therefore desirable to alleviate some or all of the above problems. In particular, it is desirable to provide a method for a base station to calculate its distance to a neighboring base station.

According to a first aspect of the disclosure, there is provided a method of calculating a distance between a first and second base station in a cellular communications network, the method comprising: a first base station periodically measuring a power of received signals from a second base station; the first base station identifying a first and second most frequent power of received signals in the periodic measurements; and the first base station determining a distance to a second base station based on the identified first and second most frequent power, an assumed path loss model, and a ratio of the second base station's transmission power at a first transmission setting to its transmission power at a second transmission setting.

Embodiments of the present disclosure provide an autonomous method for a base station to calculate its distance to a neighbor, which does not rely on any control signaling. A first base station may receive signals from a neighborhood of base stations, in which a second base station is transmitting signals at a first power level for most of the time interspersed with bursts at a second, higher, power level. The first base station may then identify the first and second most frequent power of these received signals, and calculate the distance to the second base station as a function of these most frequent powers, a ratio of the first and second power level, and an assumed path loss model.

Identifying the first and second most frequent power may include defining a series of power ranges; and allocating each measured power of received signals to one of the series of power ranges, wherein the first and second most frequent power are the first and second power ranges having the most allocations. The first base station may therefore identify the first and second most frequent powers by building a histogram of the measured powers.

The second base station may operate with the first transmission setting for a greater time than the second transmission setting.

The first and second base stations may be part of a plurality of base stations. The first base station may therefore receive signals from a second base station and one or more other base stations. In this scenario, the first base station may identify the first and second most frequent power of signals received from the second base station (and other base stations) and determine the separation distance(s).

The first base station may be a Home evolved Node B.

According to a second aspect of the disclosure, there is provided a computer program containing computer-executable code which, when executed on a computer, causes the computer to perform the method of the first aspect of the disclosure.

According to a third aspect of the disclosure, there is provided a first base station comprising: a transceiver configured to receive signals from a second base station; memory; and a processor configured to: measure a power of the signals received by the transceiver and store this measurement in memory; identify a first and second most frequent power of the received signals; and determine a distance to a second base station of the plurality of neighboring base stations based on the identified first and second most frequent power, an assumed path loss model, and a ratio of the second base station's transmission power at a first transmission setting to its transmission power at a second transmission setting.

The processor may be further configured to define a series of power ranges; allocate each power measurement to one of the series of power ranges, wherein the first and second most frequent power are the first and second power ranges having the most allocations.

The processor may be further configured to determine the distance to the second base station based on the first identified first and second most frequent power and an assumed path loss model.

The second base station may operate with the first transmission setting for a greater time than the second transmission setting.

The first base station may be part of a cellular telecommunications network.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
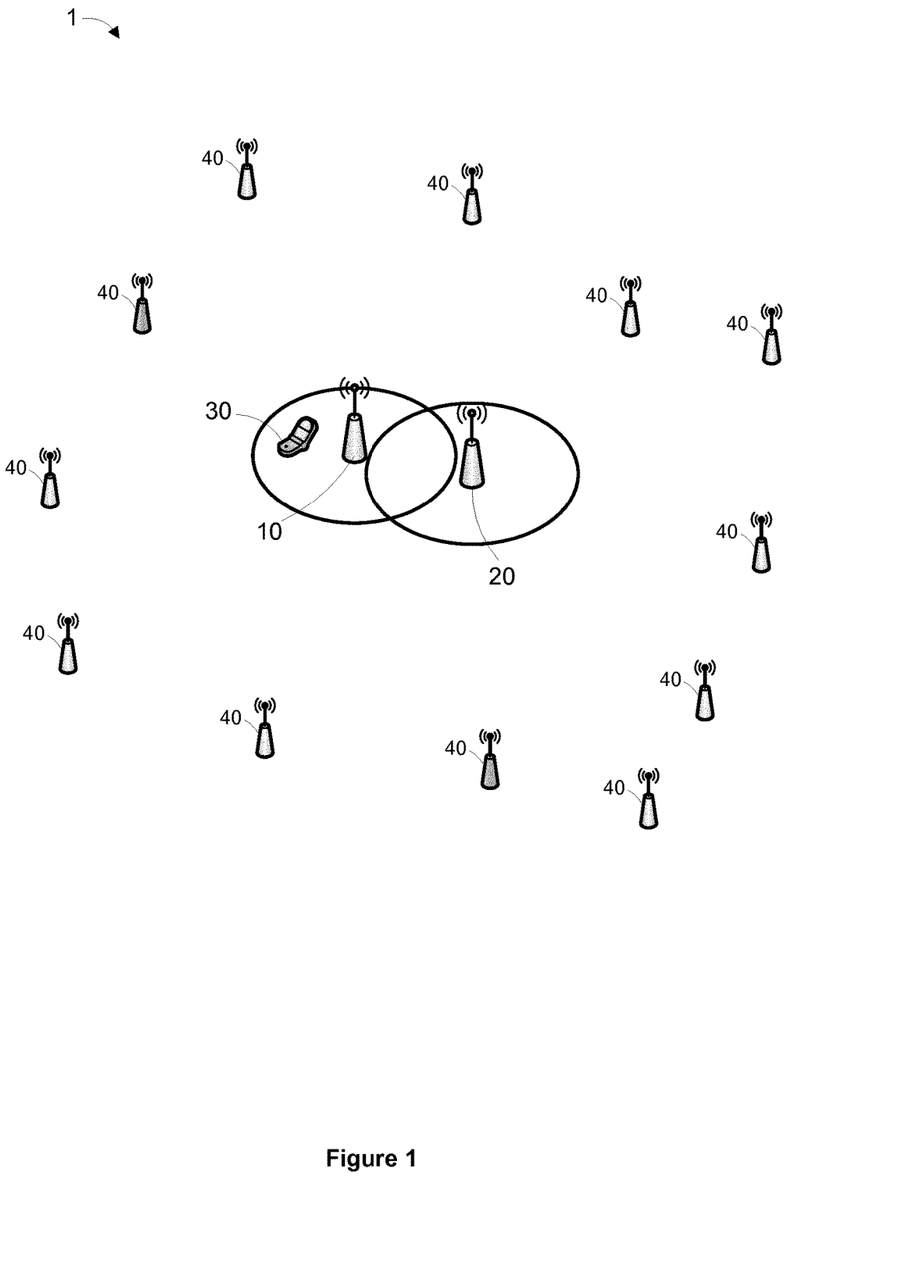
FIG. 1 is schematic diagram of a first embodiment of cellular network of the present disclosure.

A first embodiment of a cellular telecommunications network 1 of the present disclosure will now be described with reference to FIGS. 1 and 2. The cellular network 1 includes a first and second base station, which in this embodiment are both Home evolved NodeBs 10, 20 (hereinafter, "HeNB"), which are otherwise known as small cells, or femtocells, picocells or microcells depending on the coverage area. The first and second HeNBs' respective coverage areas are illustrated by the enveloping ellipses, which represent the propagation distances for signals transmitted by the first and second HeNB 10, 20. The first and second HeNBs 10, 20 are connected to a Core Network (not shown). The cellular network 1 also includes a User Equipment (UE) 30, in the coverage area of the first HeNB 10. FIG. 1 also illustrates further HeNBs 40 of the network 1, but which are not the closest neighbors of either the first or second HeNB 10, 20.

Figure 2:
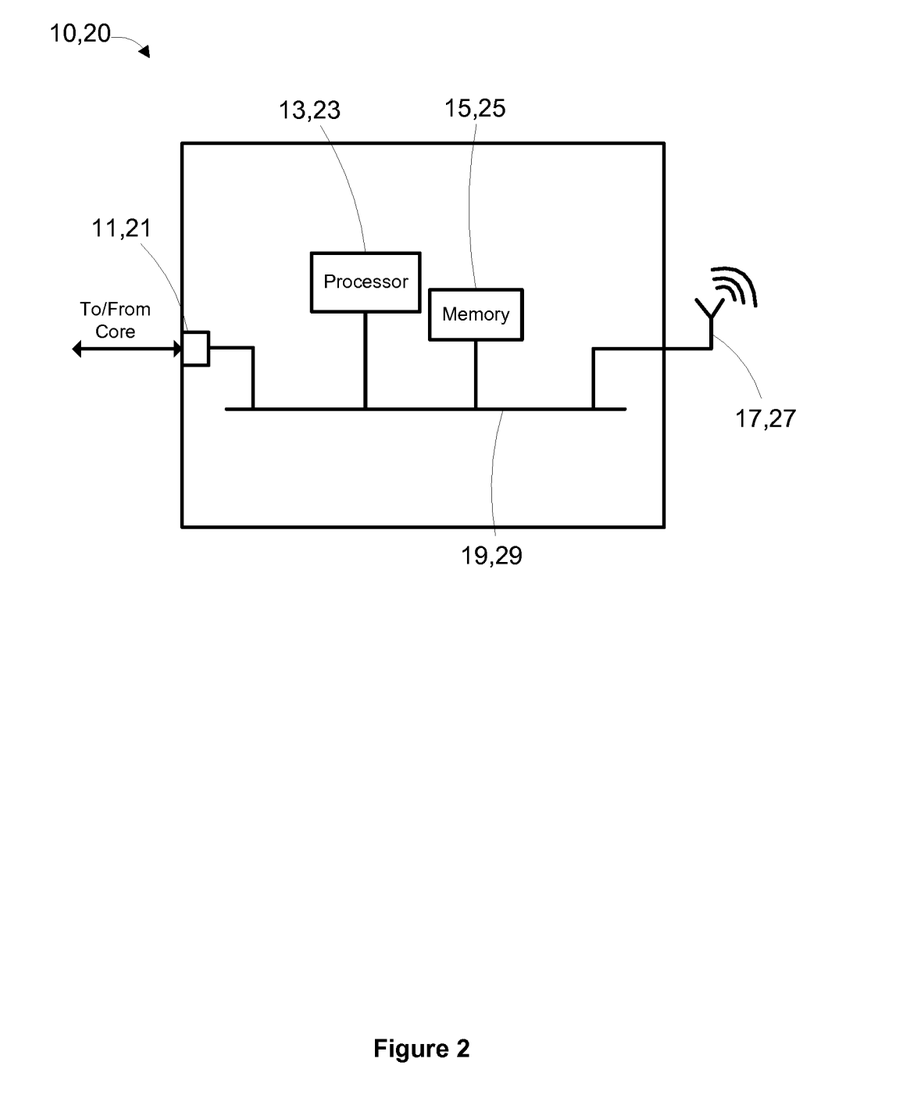
FIG. 2 is a schematic diagram of a base station of the network of FIG. 1.

FIG. 2 is a schematic diagram illustrating various components of the first and second HeNB 10, 20. The skilled person will understand that there may be several physical differences between the construction of the first and second HeNB 10, 20 (and even more so if the first or second base station were a macro base station), but FIG. 2 illustrates the various constituent parts of each which may be of a particular form depending on the deployment scenario. The first and second HeNB 20 each include a first transceiver 11, 21, a processor 13, 23, memory 15, 25, and a second transceiver 17, 27, all connected via bus 19, 29. The first transceivers 11, 21 are commonly known as the backhaul connection and are used for transmissions to and from the Core Network, which would typically be a Digital Subscriber Line (DSL) or optical fiber connection for the first and second HeNB 10, 20. The second transceivers 17, 27 are antennae configured for cellular communications (in this embodiment, via the 4G LTE protocol) with any connected UEs. The processors 13, 23 typically process data packets received via the first transceivers 11, 21 or second transceivers 17, 27 such that they are in a form to be transmitted to their destination (for example, IP data packets received at the first transceiver 11 from the Core Network may be processed into Transport Blocks (TBs) by the processor 13 for onward transmission to the UE 30 via the second transceiver 17, which may be temporarily stored in a buffer in memory 15).

The first and second HeNBs 10, 20 therefore transmit signals to UEs within their respective coverage areas via their first transceivers 11, 21. One task of the processors 13, 23 of the first and second HeNBs 10, 20 is to determine a suitable power value for these transmissions. A higher power level will typically result in a greater coverage area, such that more distant UEs may receive signals from the first transceivers 11, 21 of each HeNB 10, 20. However, this must be a balanced with a number of factors, such as the potential to cause interference should the coverage area overlap with that of another base station, reducing energy consumption, etc. In this embodiment, the first and second HeNBs 10, 20 both use a distributed Self-Organizing Network (SON) algorithm to determine a suitable transmit power level, an example of which (from the perspective of the first HeNB 10) will now be described.

The first HeNB 10 transmits signals which are divided into units in time and frequency domains. One of these units is known as a Resource Block (RB), which is further subdivided into Resource Elements (REs). As the first HeNB 10 operates in accordance with the LTE protocol, a particular set of these REs within the RBs is reserved for reference signals, and the remainder can be used for other purposes (e.g. data). In this embodiment, the first HeNB 10 receives a system information message from a Network Manager (e.g. via the Core Network and first transceiver 11, 21) indicating a range of values to be used for the reference signal power. This range may be, for example, between −30 to −10 dBm per 15 kHz. The processor 13 must select a reference signal power within this range, and then use this power for all reference signal transmissions across the entire coverage area. The power of all other signal components (e.g. for data transmission) are transmitted at powers up to this reference signal power value (typically less). The enveloping circle around the first HeNB 10 in FIG. 1 therefore represents the propagation distances of the reference signals in all directions by the second transceiver 17 at this selected reference signal power, and any other signals (e.g. for data) would only transmit up to these points.

The processor 13 therefore selects one of the range of reference signal powers from the range defined in the system information message from the Network Manager. In this embodiment, the processor 13 uses a SON algorithm to select one of the range of reference signal powers, which uses as an input parameter the separation distance between the first and second HeNB 10, 20. This selected reference signal power is then used by the first HeNB 10 to transmit reference signals thereafter. In this embodiment, the first HeNB 10 is also configured to intermittently transmit reference signals at a greater power than the selected reference signal power for relatively short periods of time. These reference signals, hereinafter known as "burst reference signals", are used in embodiments of a method of the present disclosure in order to determine a distance between the two base stations. An embodiment of this method, from the perspective of the first HeNB 10, will now be described with reference to FIGS. 3 to 5.

In this embodiment, the burst reference signals are transmitted for one frame in every one hundred frames, and are transmitted at a power ten times greater than the reference signal power selected for normal operation. In S1 of the method of FIG. 3, the first HeNB 10 measures the total received power of all reference signals from all neighboring base stations. These signals are received at the second transceiver 17 and are processed by a Radio Environment Monitoring (REM) function within the processor 13 to determine the total received power. In S3, this measurement is stored in memory 15 together with a timestamp of the measurement. The method iterates these two steps until a suitable amount of data has been collected at S5 (this point will become clear to the skilled person upon review of the following description).

Figure 4:
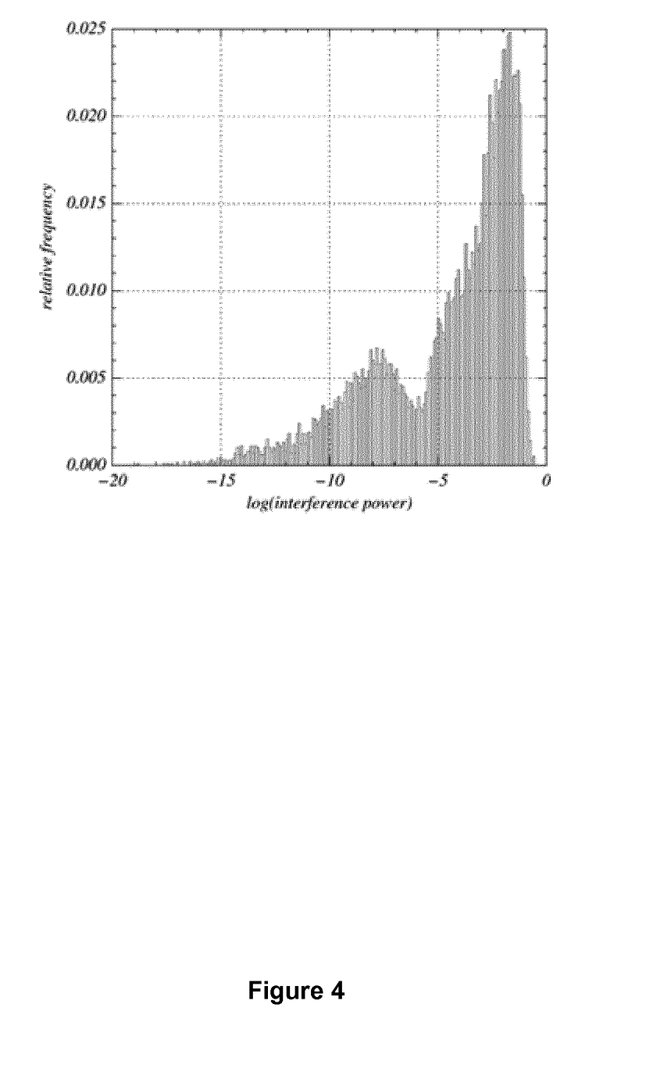
FIG. 4 is a histogram illustrating the data generated by a base station performing the method of FIG. 3.

FIG. 4 is a histogram illustrating the data contained in memory 15 after a series of measurements by the first HeNB 10, which is based on data generated in a simulated environment. In this simulation, the standard deviation of the Gaussian noise in the system was one. This histogram illustrates the relative frequency of the power measurements made in S1, with the natural log of these measurements along the x-axis. This histogram illustrates two significant peaks, which is a result of the second HeNB 20 transmitting most of the time at the reference signal power but intermittently transmitting burst reference signals at ten times the reference signal power. In S7, the processor 13 of the first HeNB 10 analyses the data stored in memory 15 to determine the measured power at these two peaks. More specifically, the processor 13 defines a series of power ranges, and allocates each measured power from S1 into one of these power ranges. The processor 13 then uses a k-means algorithm, in which the value of k is set to two, to identify the measured power in the two most frequent power ranges. An example of a suitable k-means algorithm for use in this embodiment may be found in "*Some methods for classification and analysis of multivariate observations*", J. MacQueen, Proc. Fifth Berkeley Symp. on Math. Statist. and Prob., Vol. 1 (Univ. of Calif. Press, 1967), 281-297. In the present example as shown in FIG. 4, the two peaks occur at:

$$x_1 = r^{-1}, x_2 = r^{-2}$$

Figure 3:
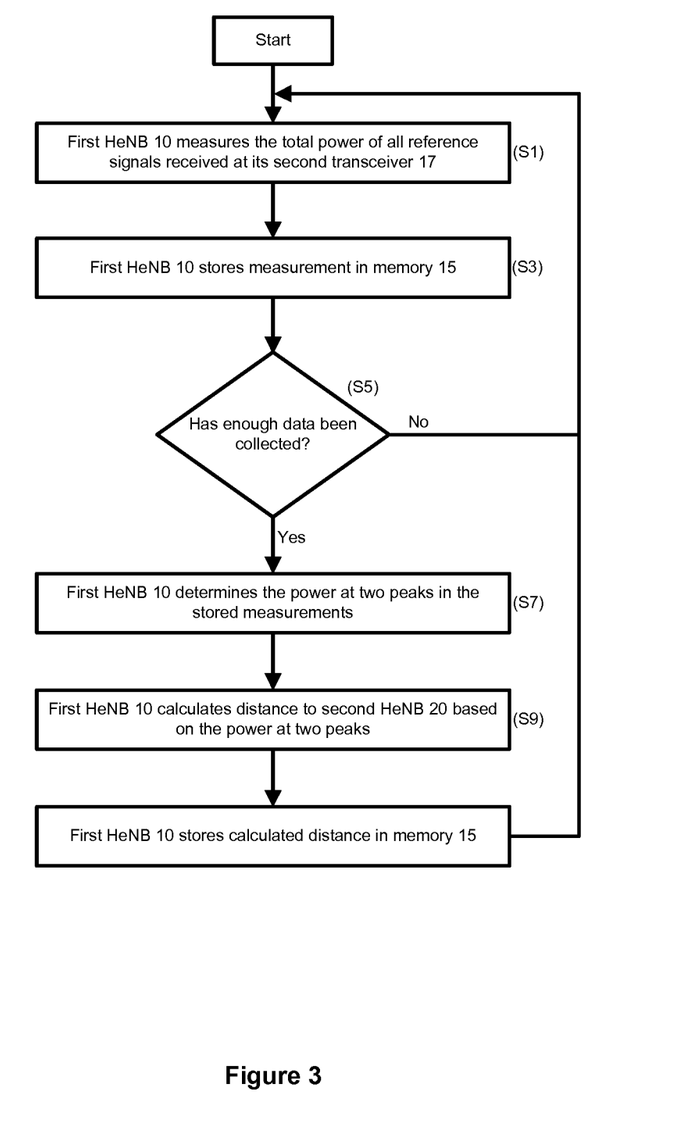
FIG. 3 is a flow diagram illustrating a first embodiment of a method of the present disclosure.

In S9, the processor 13 calculates the distance between the first and second HeNBs 10, 20. In this calculation, the processor 13 assumes a pathloss model of:

$$x = \frac{p}{r^4}$$

In which x is the power of the signal received by the first HeNB 10, p is the power of the signal transmitted by the second HeNB 20, and r is the distance between the first and second HeNBs 10, 20. Further assuming that r does not change between the transmissions at the reference signal power and burst signals at a greater power, the processor 13 may calculate distance r by solving for r in the previous equation, giving:

$$r = \left(\frac{|x_1 - x_2|}{\lambda}\right)^{\frac{-1}{4}}$$

In the present example, in which λ is the ratio of the normal operating power to the burst signal power (i.e. 0.1), the distance between the first and second HeNB 10, 20 is 2.93 meters.

In S11, the first HeNB 10 stores the value of r in memory together with a timestamp of the calculation. The first HeNB 10 may then use this value of r in a SON algorithm when determining a configuration parameter. The process loops back to S1 in which the first HeNB 10 takes a series of measurements of the total power of all received reference signals. The first HeNB 10 may therefore continually update this value of r to be used in future SON algorithm calculations (which may be necessary if one of the base stations is moved or a new nearest neighbor is introduced to the cellular network 1). To reduce the computational burden on the first HeNB 10, there may be a time delay before the process is repeated.

Figure 5:
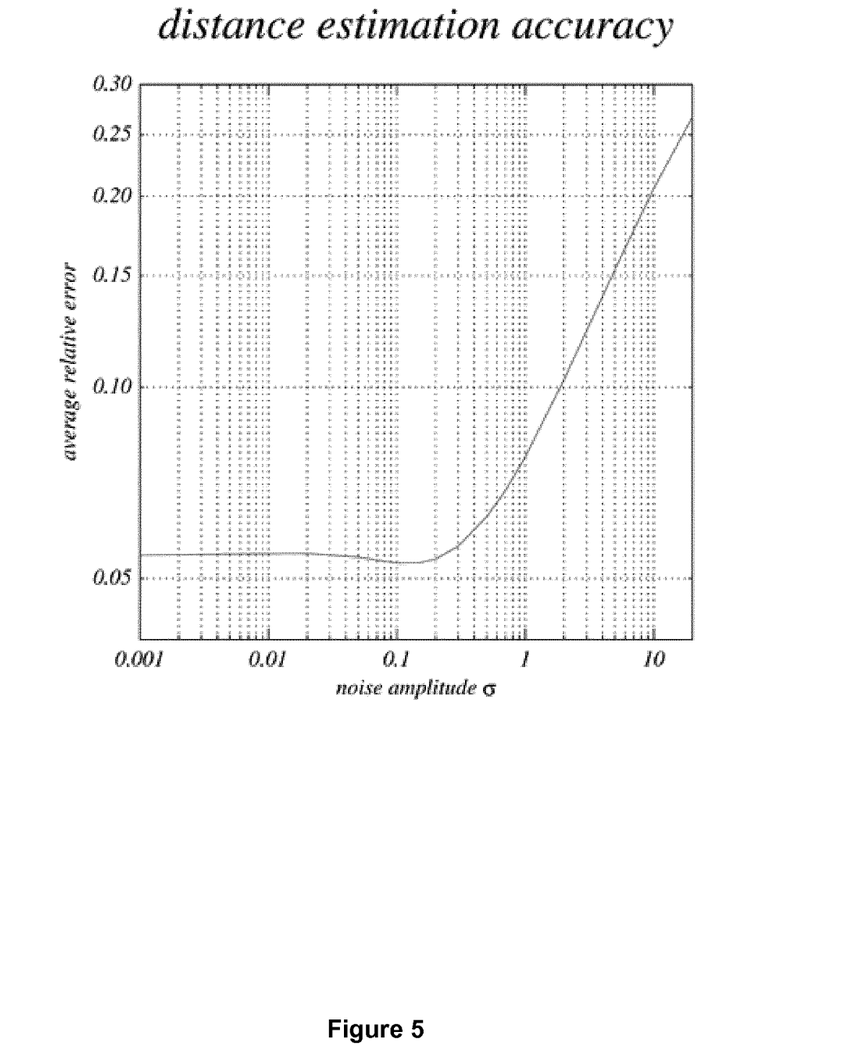
FIG. 5 is a graph illustrating the accuracy of distance estimation of the method of FIG. 3.

FIG. 5 is a graph illustrating the accuracy of the above method in a simulated environment. This graph shows the average relative error over many realizations of a random process of positioning base stations in a cellular network (but with the same mean node density per unit area) on the y-axis and the radio noise in the system on the x-axis. For low-noise systems (i.e. below 0.2), the simulation shows that the mean estimation error is constant, at around 6%, as the error is dominated by errors due to the random positioning of the base stations. For larger noise levels the error increases approximately linearly on a log-log scale.

The above embodiment therefore provides a method for base stations to autonomously calculate a distance to their nearest neighbor on a purely radio-based method, which requires no signal decoding and no increase in control signaling between base stations. This value may then be used to configure certain parameters of the base station, such as the transmit power.

In the above algorithm, the first HeNB 10 collects data in S1 and S3 until a suitable amount of data is collected. This decision point may be more accurately described as the point at which the first HeNB 10 has enough data to identify two peaks in the distribution, at which point it may proceed to S7. If the first HeNB 10 does not have enough data to identify two peaks in the distribution, then it may return to S1. Furthermore, the skilled person will understand that the use of the k-means algorithm to identify peaks in the distribution is an example and is non-essential. Thus, other algorithms, such as simple peak-detection based on finding triples of low-high-low values, may be used.

The above embodiment also relies on an assumed pathloss model of $p/r^4$. The skilled person will understand that other pathloss models may be used, and may also provide more accurate estimates of the distance to a neighboring base station if the pathloss model is more appropriate for the particular propagation environment.

The above embodiment uses one reference signal power at normal times and another power for reference signals for a brief period of time for the "burst reference signals". These burst reference signals may be sent for one frame every one hundred frames. However, the skilled person will understand that this is just an example, and a greater or lower rate can be used. Furthermore, the periodicity of these burst reference signals may be regular or randomized. The skilled person will also understand that it is non-essential that these differing powers are used only for the reference signals. That is, the base station may use all or any part of its spectrum in the present invention, but the reference signal part is preferable as it is typically the part transmitted at the highest power level.

The base station may calculate its distance to its nearest neighbor based on a formula which is a function of the powers of both peaks in the distribution of the relative powers of received signal power and the ratio of the second base station's normal transmission power to its burst transmission power. The skilled person will understand that it is therefore preferable for each base station in the network to be pre-configured to use a particular ratio between its normal transmission power and a high power burst (such as by standardization), such that all other base stations in the network may use an assumed ratio when calculating their respective separation distances. However, this is non-essential, as base stations may also communicate this ratio via other means (e.g. control signaling).

The above embodiment was based on a simulation in which the standard deviation of the Gaussian noise in the system was one. The skilled person will understand that the method is still valid for greater standard deviations, although perhaps less accurate.

In principle, embodiments can be scaled up to calculate distances to several near neighbor's, though accuracy will degrade as more distance estimates are attempted. For example, if four peaks are identified in S7, and these fall into two pairs with the expected spacing (determined by the known or assumed ratio of the transmit powers), then the separation distances to two neighbors can be estimated.

The skilled person will also understand that any combination of features is possible within the scope of the invention, as claimed.

The invention claimed is:

1. A method of calculating a distance between a first base station and a second base station in a cellular communications network, the method comprising:
   by the first base station:
      periodically measuring a power of received signals from the second base station;
      identifying a first most frequent power and a second most frequent power of received signals in the periodic measurements; and
      determining a distance to the second base station based on:
         the identified first most frequent power and second most frequent power,
         an assumed path loss model, and
         a ratio of transmission power at a first transmission setting to transmission power at a second transmission setting of the second base station.

2. The method as claimed in claim 1, wherein identifying the first most frequent power and the second most frequent power includes:
   defining a series of power ranges; and
   allocating each measured power of received signals to one of the series of power ranges, wherein the first most frequent power and the second most frequent power are a first power range and a second power range having the most allocations.

3. The method as claimed in claim 1, wherein the second base station operates with the first transmission setting for a greater time than the second transmission setting.

4. The method as claimed in claim 1 any, wherein the first base station and the second base station are part of a plurality of base stations.

5. The method as claimed in claim 1, wherein the first base station is a Home evolved Node B.

6. A non-transitory computer-readable storage medium storing a computer program containing computer-executable code which, when executed on a computer, causes the computer to perform the method of claim 1.

7. A first base station comprising:
   a transceiver configured to receive signals from a second base station;
   memory; and
   a processor configured to:
      measure a power of the received signals and store the measurement in memory;
      identify a first most frequency power and a second most frequent power of the received signals; and
      determine a distance to the second base station based on:
         the identified first most frequent power and second most frequent power,
         an assumed path loss model, and
         a ratio of transmission power at a first transmission setting to transmission power at a second transmission setting of the second base station.

8. The first base station as claimed in claim 7, wherein the processor is further configured to:
   define a series of power ranges;
   allocate each power measurement to one of the series of power ranges,
   wherein the first most frequent power and the second most frequent power are a first power range and a second power range having the most allocations.

9. The first base station as claimed in claim 7, wherein the second base station operates with the first transmission setting for a greater time than the second transmission setting.

10. The first base station as claimed in claim 7, wherein the first base station is a Home evolved Node B.

11. A cellular network comprising the first base station of claim 7.

12. The cellular network as claimed in claim 11, wherein the first base station and the second base station are ones of a plurality of base stations.

* * * * *